(12) United States Patent
Gräter et al.

(10) Patent No.: US 8,381,955 B2
(45) Date of Patent: Feb. 26, 2013

(54) FASTENING DEVICE FOR MOTOR VEHICLES

(75) Inventors: Nicholas Gräter, Friedrichshafen (DE); Michael Krause, Albershausen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 612 days.

(21) Appl. No.: 12/560,997

(22) Filed: Sep. 16, 2009

(65) Prior Publication Data

US 2010/0065597 A1   Mar. 18, 2010

(30) Foreign Application Priority Data

Sep. 17, 2008  (DE) .................... 10 2008 047 470

(51) Int. Cl.
*B60R 7/00* (2006.01)
*B60R 11/00* (2006.01)

(52) U.S. Cl. .... 224/547; 224/545; 224/555; 248/223.31

(58) Field of Classification Search ................ 224/547, 224/545, 555, 560, 561; 248/220.21, 223.31, 248/221.11, 222.14, 224.7, 225.21
See application file for complete search history.

(56) References Cited

U.S. PATENT DOCUMENTS

| | | | | |
|---|---|---|---|---|
| 2,427,335 A | * | 9/1947 | Antonia et al. | 248/223.41 |
| 5,022,649 A | * | 6/1991 | Traub et al. | 473/488 |
| 5,695,163 A | * | 12/1997 | Tayar | 248/243 |
| 6,047,989 A | | 4/2000 | Wood | |
| 6,050,426 A | * | 4/2000 | Leurdijk | 211/94.01 |
| 7,344,116 B2 | * | 3/2008 | Ficarra et al. | 248/311.2 |
| 7,806,308 B2 | * | 10/2010 | Gunn | 224/514 |
| 2007/0007409 A1 | * | 1/2007 | Huang | 248/220.21 |
| 2008/0067209 A1 | * | 3/2008 | Gunn | 224/514 |

FOREIGN PATENT DOCUMENTS

| | | |
|---|---|---|
| DE | 20314272 U1 | 3/2004 |
| DE | 102006044165 A1 | 3/2008 |
| EP | 0636783 A1 | 2/1995 |
| WO | 2004113110 A1 | 12/2004 |

\* cited by examiner

*Primary Examiner* — Justin Larson
(74) *Attorney, Agent, or Firm* — Reinhart Boerner Van Deuren P.C.

(57) ABSTRACT

An embodiment of the present invention relates to a fastening device for the fastening of an attachment part on a carrying part, for a motor vehicle, with at least one hooking-in device, which includes a carrying element that is fastened or can be fastened to the carrying part. The fastening device further includes an attachment element that is configured to be fastened to the attachment part, and also has a securing element.

12 Claims, 5 Drawing Sheets

FASTENING DEVICE FOR MOTOR VEHICLES

CROSS-REFERENCE TO RELATED PATENT APPLICATIONS

This patent application claims the benefit of co-pending German Patent Application No. DE 102008047470.3, filed Sep. 17, 2008, the entire teachings and disclosure of which are incorporated herein by reference thereto.

FIELD OF THE INVENTION

The present invention relates to a fastening device for the fastening of an attachment part to a carrying part, more preferably of a motor vehicle.

BACKGROUND OF THE INVENTION

With motor vehicles, such as commercial vehicles, it is usual to attach attachment parts, such as for example mufflers, exhaust gas cleaning devices, vehicle batteries, fuel tank and stowage containers to a carrying part of the vehicle suitable for this purpose. Attachment parts of this type are typically mounted to a carrying frame or side member of the vehicle. For the mounting, it would be desirable that the fastening devices be able to render the attaching of the attachment parts as simple as possible.

BRIEF SUMMARY OF THE INVENTION

Embodiments of the present invention deal with the problem of stating an improved, or at least another, embodiment for a fastening device of the kind mentioned at the outset which is characterized in that it makes possible simple mounting of the respective attachment parts on the carrying part.

An embodiment of the invention is based on the general idea of equipping the fastening device with at least one hooking-in device, wherein the respective hooking-in device includes a carrying element, an attachment element and a securing element. The carrying element is fastened to the carrying part in the mounted state, while the attachment part in the mounted state is fastened to the attachment part. Through the configuration of the hooking-in device, the attachment part can be hooked in on the carrying part in that the attachment part with the corresponding carrying element interacts in a suitable manner for the hooking-in. With the help of the securing element, the hooked-in state can be secured. The proposed design leads to an extreme simplification of the mounting of an attachment part on a carrying part. The attachment element and carrying element can be mounted separately on the attachment part or the carrying part as part of preassembly so that relatively more mounting space is available. The attachment of the attachment parts on the carrying part is then effected by way of the comparatively easily performable hooking-in operation, which requires little additional space.

It is now possible to equip the respective carrying element with two U-shaped receptacles, which are open on one side in a mounting direction and spaced from one another transversely to the mounting direction. Between the receptacles, an internal thread, oriented in the mounting direction, is provided. In addition to this, the respective attachment element includes two bolt sections oriented transversely to the mounting direction and spaced from one another transversely to the mounting direction, which can be hooked in the receptacles in the mounting direction. The respective securing element in the mounted state can now engage over the two bolt sections on the open side of the receptacles transversely to the mounting direction. Here, the respective securing element can be fastened to the respective carrying part with an external thread. This external thread can, for instance, be passed through, or laterally passed, by the two bolt sections in the mounting direction, and in mounting direction engage in the internal thread of the respective carrying part. As a result of this relatively easy-to-establish, effective securing, through positive connection of the attachment element hooked into the carrying element is obtained.

According to an embodiment, the fastening device includes at least two hooking-in devices of this type, which are spaced from each other transversely to the mounting direction. In addition, at least one support device can now be provided, via which the respective attachment part in the mounted state in the mounting direction is supported on the carrying part spaced from the respective hooking-in device. Through the two hooking-in devices, intensive fixing of the attachment part on the carrying part can be realized in connection with the one support device, which makes also possible effective moment support.

It is to be understood that the features mentioned above and yet to be explained below can not only be used in the respective combination stated, but also in any other combinations or standing by themselves, without leaving the context of the present invention.

BRIEF DESCRIPTION OF THE DRAWINGS

Exemplary embodiments of the invention are shown in the drawings and are explained in more detail in the following description wherein identical reference symbols refer to identical or similar or functionally identical components.

It shows, in each case schematically

DETAILED DESCRIPTION OF THE INVENTION

Figure 1:
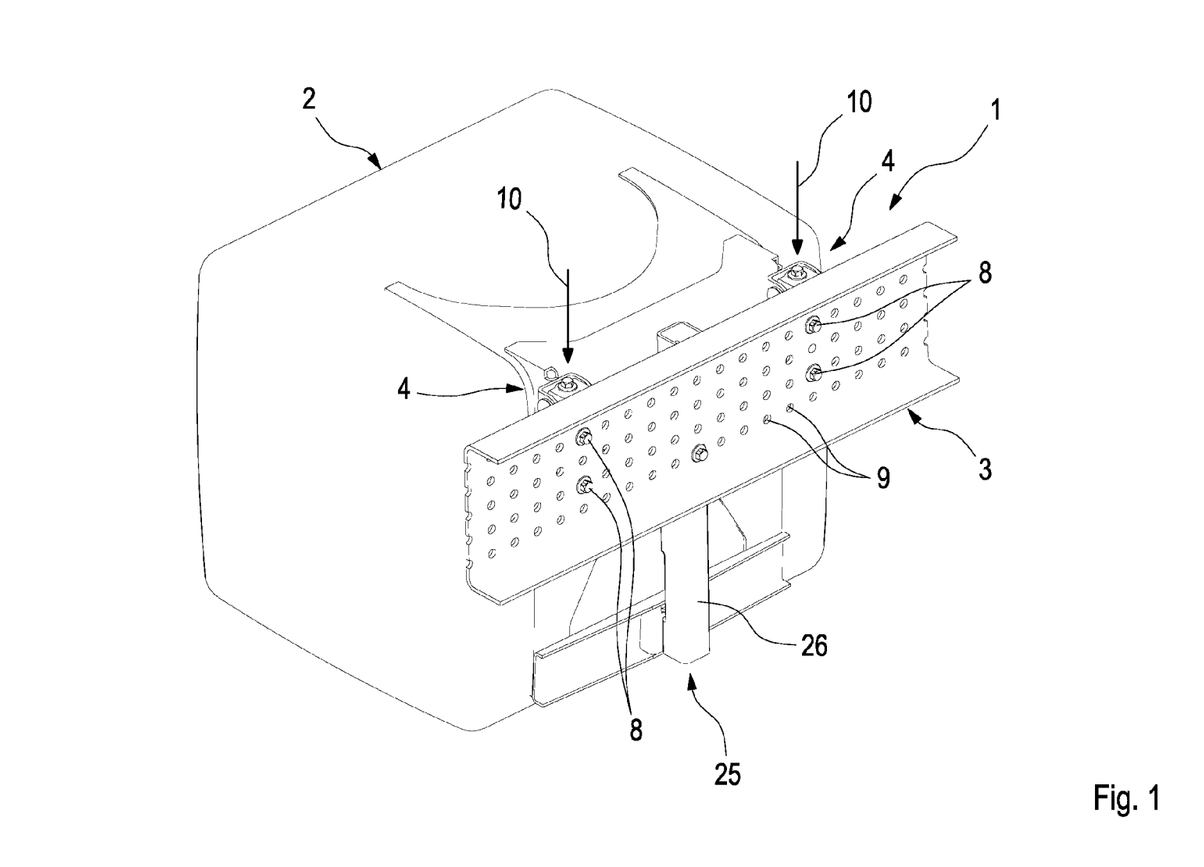
FIG. 1 is a perspective view of an attachment part fastened to a carrying part with the help of a fastening device, according to an embodiment of the invention.
Figure 2:
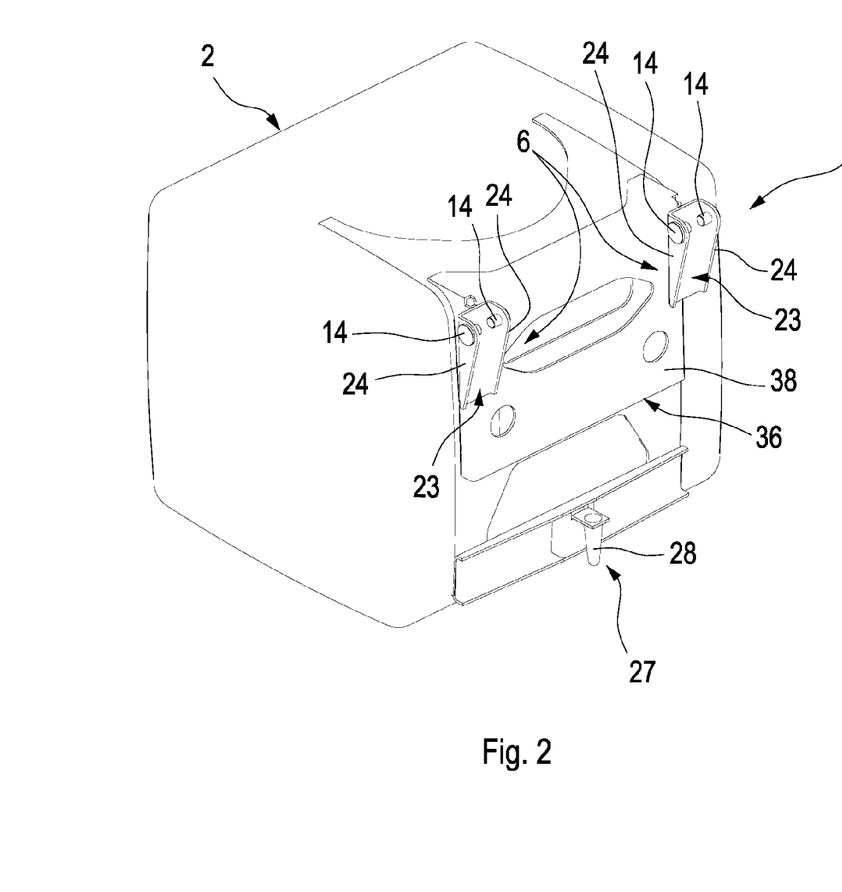
FIG. 2 is a perspective view of the attachment part with components of the fastening device attached thereto, according to an embodiment of the invention.

According to FIG. 1, an attachment part 2 can be fastened to a carrying part 3 with the help of a fastening device 1. In principle, any attachment parts 2 can be fastened to any carrying parts 3 with the help of the fastening device 1 introduced here. The fastening device 1, however, is used to fasten a vehicle attachment part 2 to a vehicle carrying part 3. For example, the respective attachment part 2 is a housing of a muffler or an air filter or a stowage box or an exhaust gas cleaning system or a vehicle battery or a fuel tank. The carrying part 3, for example, is a side member or carrying frame of the respective vehicle. In one embodiment, the vehicle is a commercial vehicle, such as, for example, a truck, a pulling vehicle, or a trailer.

According to FIGS. 1 to 9, the fastening device 1 comprises at least 1 hooking-in device 4. In the example shown, precisely two such hooking-in devices 4 are provided. In principle, there can also be more or fewer than 2 hooking-in devices 4. The respective hooking-in device 4 comprises a carrying element 5, an attachment element 6, and a securing element 7. The carrying element 5 in a mounted state is fastened to the carrying part 3. In the example shown, this can be realized with the help of suitable fastening screws 8. The fastening screws 8, to this end, penetrate through openings not designated in more detail which are formed in the carrying part 3 for this purpose. In the example shown, the carrying part 3 is provided with a hole pattern 9, at least in the region intended for the fastening of the attachment part 2, which comprises a multiplicity of such through openings, which are arranged in a predetermined grid relative to one another. Because of this, it is possible to position the two carrying elements 5 of the two hooking-in devices 4 along the carrying part 3 as a function of the respective attachment part 2. The respective attachment part 6 in the mounted state is fastened to the attachment part 2 in a suitable manner. A welded connection or soldered connection, for example, which is not designated in more detail is suitable for this purpose. In principle, a screw connection can also be provided here. Rivet connections are likewise conceivable.

The respective carrying element 5, in a mounting direction 10 symbolically shown through arrows in FIG. 1, which, for example, is oriented vertically from the top down, comprises 2 U-shaped receptacles 11, which are open on one side and spaced from each other transversely to the mounting direction 10. Between these receptacles 11, an internal thread 12 is arranged with every carrying element 5, which is oriented in the mounting direction 10. To realize this internal thread 12, the respective carrying element 5, for example, comprises a web 13, which, in the mounted state, stands away from the carrying part 3 transversely to the mounting direction 10 and extends in a horizontal plane. Furthermore, this web 13, with respect to the mounting direction 10, is located after the receptacles 11, that is below the receptacles 11.

Figure 4:
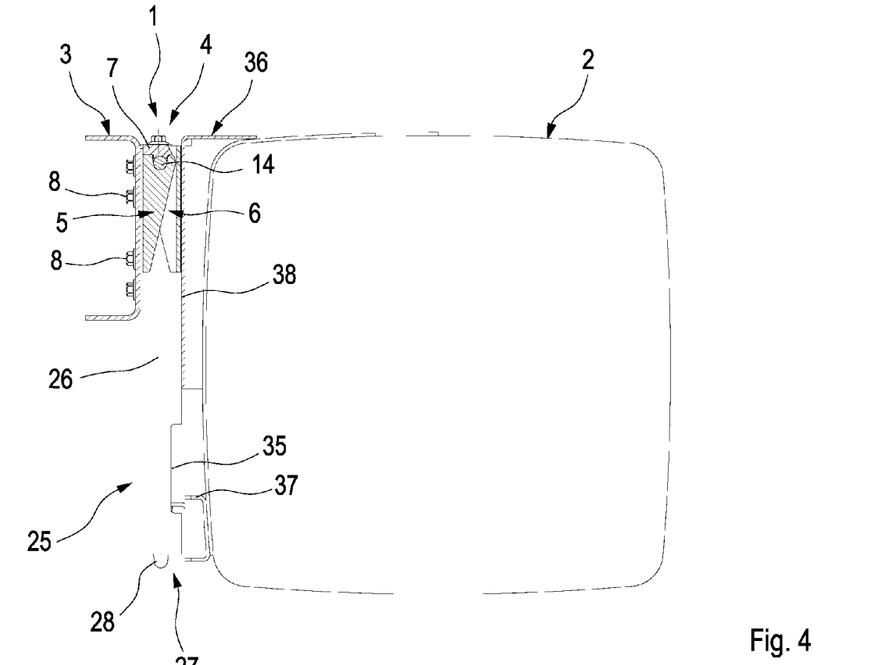
FIG. 4 is a sectional view of the attachment part fastened to the carrying part in the region of a hooking-in device of the fastening device, according to an embodiment of the invention.
Figure 5:
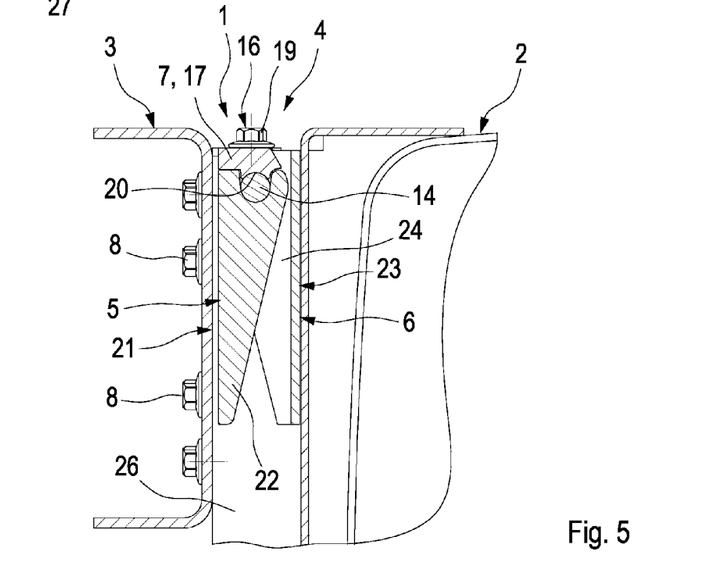
FIG. 5 is an enlarged view of the cut hooking-in device.

The respective attachment part 6 comprises two bolt sections 14, each of which is oriented transversely to the mounting direction 10, and which are additionally arranged spaced from each other transversely to the mounting direction. In the example shown, the two bolt sections 14 are formed on two separate bolts spaced from each other. Alternatively, the two bolt sections 14 can also be embodied on a single, continuous bolt. In the mounted state, which is shown in FIGS. 4 and 5, the bolt sections 14 in the mounting direction 10 are hooked into the receptacles 11. This means the respective bolt 14 positively engages in one of the receptacles 11. In the example shown, the two bolts 14 of the respective attachment element 6 are coaxially arranged relative to each other. Complementarily to this, the two receptacles 11 of the respective carrying element 5 are aligned relative to each other in bolt longitudinal direction, which is transverse to the mounting direction 10.

The securing element 7 with the respective hooking-in device 4 only serves to secure the attachment element 6 hooked into the corresponding carrying element 5 in the hooked-in state. To this end, the respective securing element 7 in the mounted state engages over the two bolt sections 14 transversely to the mounting direction 10, specifically on the respective open side of the respective receptacle 11. In the example shown, the receptacles 11 are open to the top so that the respective securing element 7 engages over the receptacles 11 from the top. In addition, the respective securing element 7 has an external thread 15 with the help of which the respective securing element 7 can be fastened to the corresponding carrying part 5. In the example shown, the respective external thread 15 is formed on a fastening screw 16, which forms a part of the respective securing element 7. Furthermore, the respective securing element 7, in this case, comprises a securing body 17. For fastening the securing element 7 to the corresponding carrying part 5, the respective external thread 15, or the fastening screw 16, is passed through, for example, between the two separate bolts 14 parallel to the mounting direction 10. The external thread 15 is then introduced into the internal thread 12 of the respective carrying part. Alternatively, the fastening screw 16 can also be laterally passed by a common bolt comprising the two bolt sections 14. External thread 15 and internal thread 12 are designed complementarily to each other so that the external thread 15 can positively engage in the respective internal thread 12. In other words, the fastening screws 16, in the example shown, can be screwed into the internal thread 15 of the respective web 13 in a space-saving manner between the bolts 14.

The securing body 17 has a through opening 18 oriented in the mounting direction 10 through which the fastening screw 16 can be passed. In the mounted state, a head 19 of the respective fastening screw 16 supports itself on the securing body 17 in the mounting direction 10 on a side of the securing body 17 facing away from the bolt sections 14. The securing body 17 in the process engages over the bolt sections 14 on the respective open side of the receptacles 11.

According to the embodiment shown in FIGS. 1 to 5, the receptacles 11 opposite their respective open side are formed complementarily to the outer contour of the respective bolt section 14. In the example, the bolts 14 have a substantially circular cross section. Accordingly, the receptacle sections 11 opposite their open side are configured in a semi-circular shape. In principle however, other shapes are also conceivable. In the example, the securing element 7 or its securing body 17 are additionally equipped with a contact contour 20 with which the respective securing element 7, in the mounted state, rests against the respective bolt section 14. Here, a corresponding contact contour 20 is provided for each bolt section 14. The contact contours 20 are shaped complementarily to the outer contours of the bolt sections 14. Accordingly, the contact contours 20 are designed in the shape of an arc of a circle here. Furthermore, the securing elements 7 or their securing bodies 17, in the example shown, are embodied so that, in the mounted state, they close the open sides of the receptacles 11. To this end, the respective securing element 7 in the region of its contact contours 20 can engage in the respective receptacle 11 in the mounting direction 10.

In the example shown in FIGS. 1 to 5, the respective carrying element 5 has a carrying base 21 as well as two carrying webs 22 standing away from said carrying base. The carrying base 21 in the mounted state is fastened to the carrying part 3, and extends parallel to a plane of the carrying part 3. In contrast with this, the carrying webs 22 extend vertically to the plane of the carrying part 3 and each comprises one of the receptacles 11. Here, the carrying element 5 can be embodied as a shaped sheet metal part. Similar to this, the respective attachment element 5 can comprise an attachment base 23 and two attachment webs 24 standing away from said attachment base. The attachment base 23, in the mounted state, is fastened to the attachment part 2, and can also extend in a plane which runs parallel to the mounting direction 10. The attachment base 23 extends parallel to the carrying base 21. In contrast with this, the attachment webs 24 extend transversely to the plane of the attachment base 23, and each comprises one of the bolt sections 14. The carrying webs 22 and the attachment webs 24 are each arranged spaced from one another transversely to the mounting direction 10, wherein the spacings of the individual webs 21, 24 are matched to one another in such a manner that, in the mounted state, the carrying webs 22 are arranged between the attachment webs 24.

Figure 3:
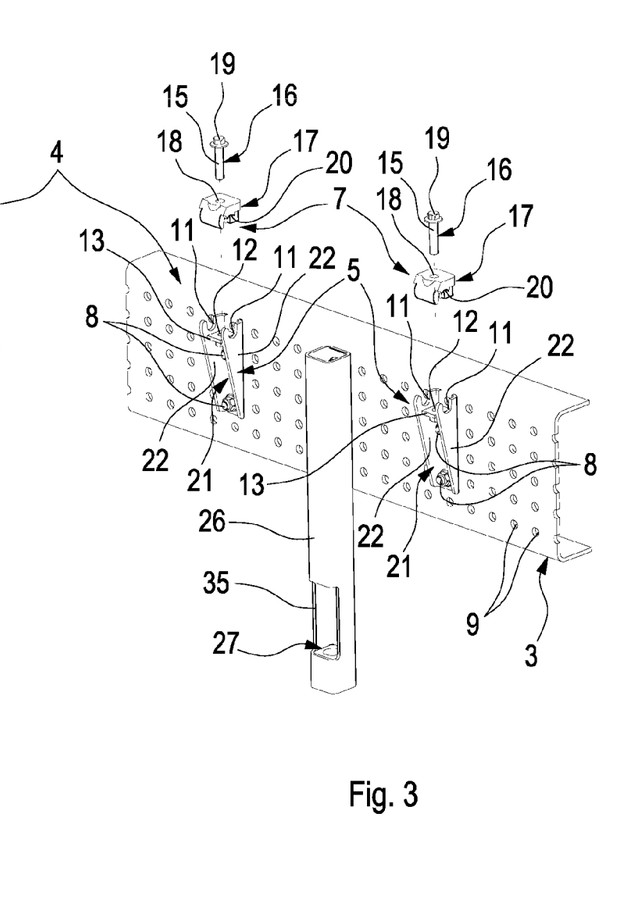
FIG. 3 is a perspective view of the carrying part with components of the fastening device attached thereto, according to an embodiment of the invention.

The web 13, shown in FIG. 3, can be molded integrally on the respective carrying base 21, while it extends in a plane which runs transversely to the mounting direction 10.

For FIGS. 1 to 10, the fastening device 1 in the embodiment shown here additionally comprises at least one support device 25. In the example, exactly one such support device 25 is provided which is arranged in the middle between the two hooking-in devices 4. In principle however, a plurality of support device 25 are also conceivable. By way of the respective support device 25, the attachment part 2, in the mounted state, is indirectly supported on the carrying part 3, and specifically in mounting direction 10 spaced from the hooking-in devices 4. In the example shown, the support device 25 comprises a carrier 26, which extends parallel to the mounting direction 10. This carrier 26 on the one hand is fastened to the carrying part 3. To this end, the carrier 26 can, for example, be screwed to the carrying part 3 utilizing the whole pattern 9. In principle, other fastening techniques are also conceivable. On the other hand, the carrier 26 is indirectly connected with the respective attachment part 2 via a coupling device 27, when the attachment part 2 is fastened to the carrying part 3 via the fastening device 1.

Figure 6:
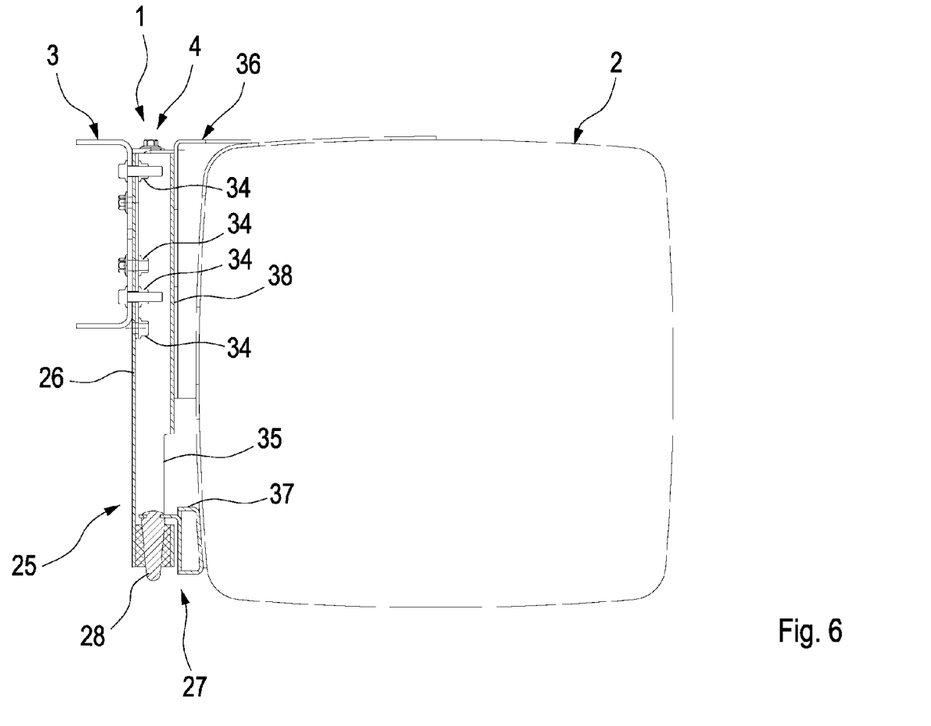
FIG. 6 is a cut view of the attachment part fastened to the carrying part in the region of a support device with a first embodiment, according to an embodiment of the invention.
Figure 7:
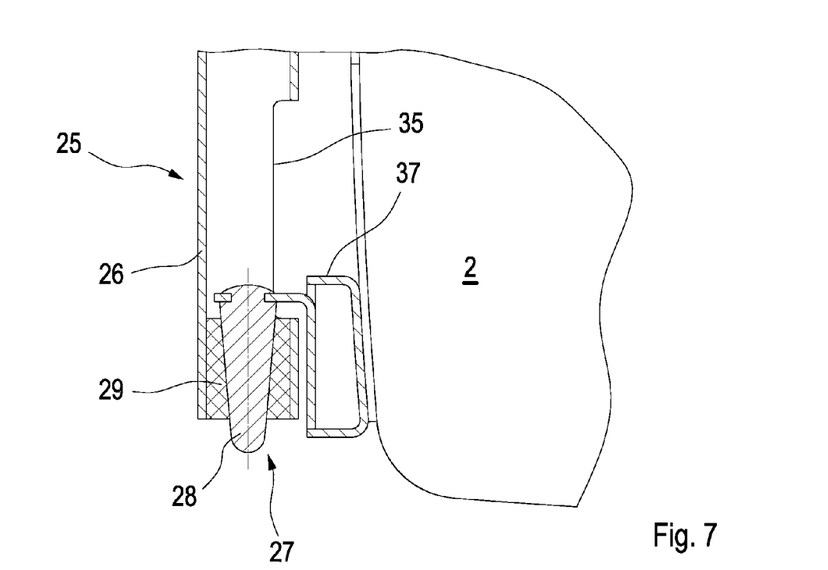
FIG. 7 is an enlarged sectional view of the support device from FIG. 6.

According to the embodiment shown in FIGS. 6 and 7 the coupling device 27 includes a pin 28, which is fastened to the attachment part 2 in a suitable manner. Furthermore, the coupling device 27 comprises a pin receptacle 29, which is complementary to the pin 28. The pin receptacle 29 is formed on the carrier 26 in a suitable manner. In the mounted state, the pin 28, which extends in the mounting direction 10, is inserted in the pin receptacle 29 in the mounting direction 10. At least one of the components, pin 28 and pin receptacle 29, can be manufactured of a rubber-elastic material, more preferably of a damper material. Because of this, the fastening device 1 can additionally realize intensive vibration damping, since the attachment part 2, mounted on the carrying part 3, can form a system capable of vibration.

In the example shown, the pin 28 is designed conically in such a manner that it tapers in the mounting direction 10. The pin receptacle 29 is designed complementarily thereto and accordingly likewise formed conically.

Figure 8:
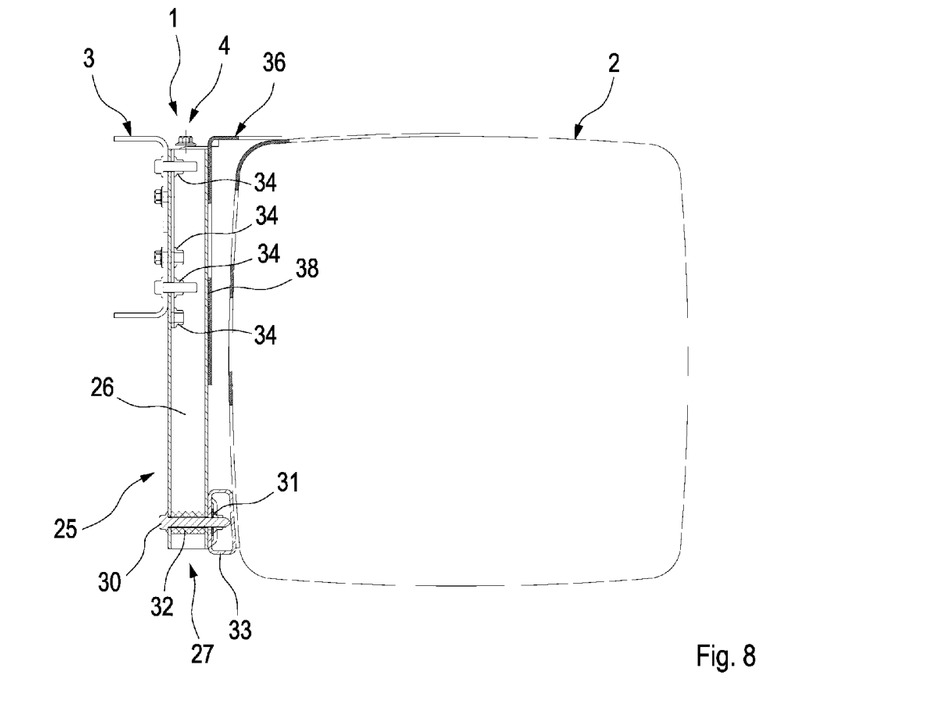
FIG. 8 is a sectional view of the attachment part fastened to the carrying part in the region of the support device with a second embodiment, according to an embodiment of the invention.
Figure 9:
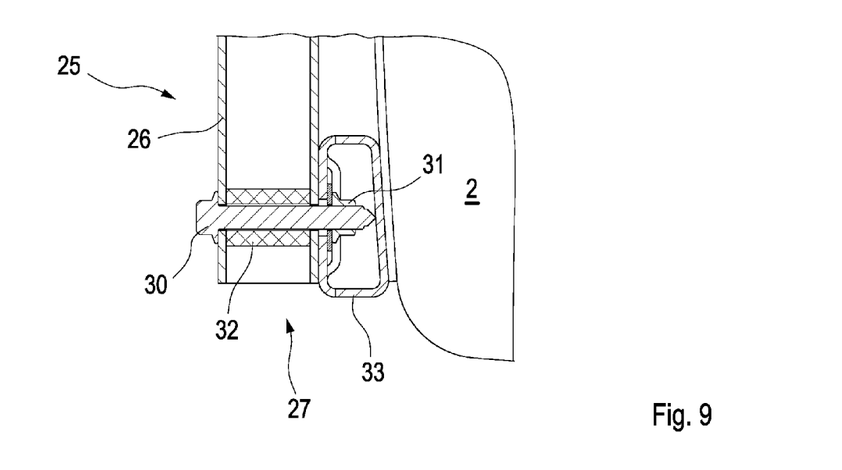
FIG. 9 is an enlarged sectional view of the support device from FIG. 8.

In the embodiment shown in FIGS. 8 and 9, the coupling device 27 is designed as a screw-on point. Here a screw 30 engages in a nut 31. The nut is attached to the attachment parts 2, and the screw 30 penetrates the carrier 26. In the carrier 26 in the example of FIGS. 8 and 9, a sleeve 32 is arranged, which is coaxially penetrated by the screw 30. The nut 31 can principally be attached to, or arranged on, the attachment part 2 in any manner. It can, for example, be a weld nut, which is directly or indirectly welded to the attachment part 2 in a suitable manner. In the example shown however, a cage 33 is formed on the attachment part 2 in which the nut 31 is arranged. As far as this is concerned, it is a cage nut. The cage 33, in this case, is configured so that the nut 31 can be easily inserted therein, and is arranged therein in a rotationally fixed manner.

The carrier 26, in the embodiments shown, is configured as tubular body, or as square tube. In mounting direction 10, it is larger dimensioned than the carrying part 3, so that, in mounting direction 10, it protrudes over the carrying part 3. The carrier 26 is matched to the height of the attachment part 2 measured in mounting direction 10. For simplified fastening of the carrier 26 on the carrying part 3, prepared internal threads can be formed on the carrier 26. According to FIG. 6, these are realized, for example, by means of weld nuts 34, which are arranged on the inside of the tubular body.

With the embodiment shown in FIGS. 3 to 7, the carrier 26, designed as tubular body, is provided with a window 35 which allows engagement for the pin 28.

For the simplified preassembly of the attachment elements 6 on the attachment part 2, the attachment part 2 can be provided with a console 36, which, for example, is welded to the attachment part 2, or attached thereto in another suitable manner. The two attachment elements 6 are fastened to this console 36 in a suitable manner. In addition, the pin 28 can be fastened to this console 36 by means of a suitable pin carrier 37. Likewise, the cage 33 can be fastened to set console 36. Furthermore, the console 36 can have a contact contour 38, which is so matched to the fastening device 1 that the carrier 26, in the mounted state, comes to bear against this contact contour 38. As a result, the attachment part 2 can support itself on the carrying part 3 by way of the carrier 26. Because of this, the moment support between attachment part 2 and carrying part 3 realizable with the help of the support device 25 can be improved.

For the mounting of the attachment part 2 to the carrying part 3 with the help of the introduced fastening device 1, the following procedure is provided.

Initially, as part of preassembly, the carrying elements 5 and the carriers 26 are fastened to the carrying part 3. Depending on the dimension of the attachment part 2 to be attached, the spacings and positions of the attachment elements 5 and of the carrier 26 can vary. The length of the carrier 26 can also vary as a function of the dimension of the attachment part 2 to be attached. In addition, as part of the preassembly, the attachment elements 6 are attached to the respective attachment part 2 just as the component of the support device 25 on the attachment part side such as, for example, the pin 28 or the nut 31. The console 36 can be used for this purpose.

For the mounting of the attachment part 2 on the carrying part 3, the attachment part now has to be hooked into the receptacles 11 of the carrying elements 5 on the carrying part 3 via the bolt sections 14 of the attachment elements 6. When using the pin 28, the pin 28 previously had to be introduced into the hollow carrier 26 through the window 35. With the hooking-in of the bolt sections 14 in the receptacles 11, the pin 28 is also introduced in the pin receptacle 29. When using the screw-on point as a coupling device 27, the attachment part 2 can also be hooked in obliquely on the carrying part 3. The bolt sections 14, circular in cross section, then allow swiveling of the hooked-in carrying part 2 about the longitudinal axis of the bolt sections 14. Because of this, the carrier 26 comes to bear, for example, on the cage 33 so that the screw 30 can then be screwed together with the nut 31. Following the hooking-in of the attachment part 2 on the carrying part 3, the securing elements 7 are mounted. To this end, the securing bodies 17 are placed on to the bolt sections 14 and fastened to the respective carrying element 5 with the help of the respective fastening screw 16.

Assembly and disassembly, if required of the attachment part 2, requires comparatively little assembly space because of the use of the fastening device 1 introduced here, which considerably simplifies assembly and disassembly.

What is claimed is:

1. A fastening device for the fastening of an attachment part on a carrying part, for a motor vehicle, with at least one hooking-in device, comprising:
a carrying element configured to be fastened to the carrying part;
an attachment element configured to be fastened to the attachment part; and
a securing element, wherein
the respective carrying element comprises:
two U-shaped receptacles open on one side in a mounting direction, spaced from each other transversely to the mounting direction and an internal thread arranged between the receptacles and oriented in the mounting direction;
wherein the respective attachment element comprises two bolt sections oriented transversely to the mounting direction and spaced from each other transversely to the mounting direction, the two bolt sections hooked into the receptacles in the mounting direction;
wherein the respective securing element, in the mounted state, engages over the two bolt sections on the open side of the receptacles transversely to the mounting direction, and is fastened to the respective carrying part with an external thread; and
wherein the respective external thread is passed through the two bolt sections in the mounting direction, or passed by the bolt sections in the mounting direction, and in the mounting direction engages in the internal thread of the respective carrying part.

2. The fastening device according to claim 1, wherein
the respective securing element comprises:
a securing body and a fastening screw;
wherein the securing body, in the mounted state, covers the bolt sections and comprises a through opening oriented in the mounting direction;
wherein the fastening screw includes the external thread of the securing element, and is insertable through the through opening in the internal thread of the respective attachment element; and
wherein a head of the fastening screw, in the mounted state, is supported in the mounting direction on a side of the securing body facing away from the bolt sections.

3. The fastening device according to claim 1, wherein
the respective receptacle opposite its open side is shaped complementarily to the respective bolt section.

4. The fastening device according to claim 1, wherein
the respective securing element, in the mounted state and in the mounting direction, comes to bear on the bolt sections with at least one contact contour each, which is shaped complementarily to the respective bolt section.

5. The fastening device according to claim 1, wherein
the respective securing element, in the mounted state, closes the open sides of the receptacles of the respective carrying element.

6. The fastening device according to claim 1, wherein
the respective attachment element comprises:
an attachment base configured to be fastened to the attachment part; and
two attachment webs standing away from said attachment base and spaced from each other transversely to the mounting direction;
wherein the two attachment webs comprise the bolt sections.

7. The fastening device according to claim 1, wherein
at least two hooking-in devices are provided and, which are arranged spaced from each other transversely to a mounting direction.

8. The fastening device according to claim 1, wherein
the respective carrying element comprises:
a carrying base configured to be fastened to the carrying part; and two carrying webs standing away therefrom and spaced from each other transversely to the mounting direction; wherein the two carrying webs comprise the receptacles.

9. The fastening device according to claim 8, wherein
the carrying webs, in the mounted state, are arranged between the attachment webs.

10. A fastening device for the fastening of an attachment part on a carrying part, for a motor vehicle, with at least one hooking-in device, comprising:
a carrying element configured to be fastened to the carrying part;
an attachment element configured to be fastened to the attachment part; and
a securing element, wherein
at least one support device is provided, which via the respective attachment part, in the mounted state and in a mounting direction, is supported on the carrying part spaced from the at least one hooking-in device;
wherein the respective support device is arranged transversely to the mounting direction, in the middle between two hooking-in devices; and wherein the respective support device comprises a carrier extending in mounting direction, which is fastened to the carrying part, and is connected with the attachment part via a coupling device.

11. The fastening device according to claim 10, wherein
the coupling device comprises:
a pin fastened to the attachment part and extending in the mounting direction; and
a pin receptacle complimentary thereto and embodied on the carrier in which the pin in the mounting direction is inserted.

12. The fastening device according to claim 10, wherein
the coupling device is configured as a screw-on point.

* * * * *

UNITED STATES PATENT AND TRADEMARK OFFICE
CERTIFICATE OF CORRECTION

| | | |
|---|---|---|
| PATENT NO. | : 8,381,955 B2 | Page 1 of 1 |
| APPLICATION NO. | : 12/560997 | |
| DATED | : February 26, 2013 | |
| INVENTOR(S) | : Nicolas Gräter | |

It is certified that error appears in the above-identified patent and that said Letters Patent is hereby corrected as shown below:

On the Title Page, Item [75]:

Inventor name is incorrectly spelled "Nicholas Gräter" and should be correctly spelled "Nicolas Gräter"

Signed and Sealed this
Thirteenth Day of August, 2013

Teresa Stanek Rea
*Acting Director of the United States Patent and Trademark Office*